United States Patent
Stolitzka et al.

(10) Patent No.: US 6,486,636 B1
(45) Date of Patent: Nov. 26, 2002

(54) RECHARGEABLE BATTERY MEASUREMENT AND CALIBRATION SYSTEM AND METHOD

(75) Inventors: Dale F. Stolitzka, Los Altos, CA (US); Steven E. Austin, Penn Valley, CA (US)

(73) Assignee: Analog Devices, Inc., Norwood, MA (US)

( * ) Notice: Subject to any disclaimer, the term of this patent is extended or adjusted under 35 U.S.C. 154(b) by 0 days.

(21) Appl. No.: 10/126,070

(22) Filed: Apr. 19, 2002

(51) Int. Cl.[7] .................................. H02J 7/00
(52) U.S. Cl. ........................ 320/134; 320/128
(58) Field of Search .................. 320/134, 128, 320/162, 163, 164; 324/426; 340/636

(56) References Cited

U.S. PATENT DOCUMENTS 5,541,489 A * 7/1996 Dunstan ............... 320/134

OTHER PUBLICATIONS

Smart Battery System Specifications, Smart Battery System Manager Specification, Revision 1.0, Dec. 15, 1998, Release Candidate b, pp. i–22.

Maxim Digitally Controlled Fuel–Gauge Interface, Max1660, Rev 1; Oct./1998, pp. 1–20.

Unitrode, Gas Gauge IC With SMBus–Like Interface, bq2092, Jun./1999, pp. 1–28.

Benchmarq Products From Texas Instruments, Gas Gauge IC With SMBus Interface, bq2040, Jun. 1999, pp. 1–32.

* cited by examiner

Primary Examiner—Edward H. Tso
Assistant Examiner—Lawrence Luk
(74) Attorney, Agent, or Firm—Koppel, Jacobs, Patrick & Heybl

(57) ABSTRACT

A rechargeable battery measurement and calibration system for use with a removable battery pack suitably used to power a mobile computer locates current measurement and battery status intelligence outside of the battery pack, thereby reducing the cost, complexity, and power consumption of the battery pack when compared with prior art systems. A system host controls the measurement and calibration of the battery system; the host requests current measurements under both zero-current and non-zero calibration current conditions, with the resulting calibration values enabling linearity errors that might otherwise be present in the current measurements to be totally and easily identified and accounted for in a fuel gauge measurement. The present system complies with the SBS-IF specification for Smart Battery systems.

26 Claims, 6 Drawing Sheets

RECHARGEABLE BATTERY MEASUREMENT AND CALIBRATION SYSTEM AND METHOD

BACKGROUND OF THE INVENTION

1. Field of the Invention

This invention relates to the field of battery systems, and particularly to rechargeable battery systems for mobile computers.

2. Description of the Related Art

Many electronic products include rechargeable batteries which enable them to operate without connection to an AC power source. The status of the battery is often of critical importance to the product's user, as the product can operate only as long as the battery retains some useful life. For example, mobile computers, which are powered by a removable battery pack when not connected to an AC power source, typically provide a battery status screen to a user which includes an estimation of the remaining life for the battery housed within the pack.

One parameter which is often of interest is the charge level on the battery. Battery capacity in ampere-hours is typically calculated by measuring current flow in to and out of the battery, and integrating the current over time. Some recent mobile computers have embedded a microcontroller or complex finite state machine (FSM) integrated circuit inside the battery pack as a sub-system of the mobile computer. Using this device in combination with a number of sensors, voltage, temperature, current and various other variables are measured with circuitry housed within the battery pack itself. This results in a very complex and expensive battery pack. Nevertheless, this approach has been adopted as an industry standard by the Smart Battery System Implementers Forum (SBS-IF).

A block diagram of a battery system for a mobile computer which complies with the SBS-IF specification is shown in FIG. 1. A battery pack 10 includes a rechargeable battery and the associated sensors and circuitry mentioned above. Current is provided to and drawn from the pack via a line 12, and the pack is connected to a common point via a line 14.

When connected to an AC power source, an AC/DC converter 18 provides a DC supply voltage for the battery system via a line 19. When the DC supply voltage is present, it powers the system host 20 (which includes a mobile computer's microprocessor and associated circuitry), typically via one or more DC/DC converters 22. A power detection circuit 23 detects the presence or absence of the DC supply voltage; when present, a switch S1 is operated such that power is provided to a battery charger 24, which in turn provides charging current to battery pack 10. When the DC supply voltage is absent, switch S1 connects battery pack 10 to DC/DC converters 22, so that system host 20 is powered by the rechargeable battery.

Communications between battery pack 10, system host 20, and battery charger 24 are handled with a serial bus referred to as an "SMBus" 26, which complies with the requirements of the SBS-IF. The system also requires that battery pack 10 provide a "safety signal" 28 to charger 24, to prevent overcharging.

Various conventional implementations of battery pack 10 are shown in FIGS. 2a–2d. Each battery pack includes the battery itself 30, a current sense resistor 32, a pair of FET switches 34 and 36, and circuitry 38. The FET switches are controlled by circuitry 38 to prevent either overcharging or over-discharging the battery 30. In each figure, the current through the sense resistor is designated as $I_S$, and the current required to power circuitry 38 is designated as $I_C$; $I_S$, is determined by measuring the voltage across resistor 32 and dividing by its resistance. The current into or out of the battery pack is designated as $I_{BP}$.

To accurately measure $I_{BP}$, it is preferable to calibrate circuitry 38. Ideally, this requires the ability to measure the voltage across sense resistor 38 with no current flowing in it, to determine how much zero signal offset is in circuitry 38. However, when pack 10 is configured as shown in FIG. 2a, circuitry 38 always puts a small current drain ($I_C$) on the battery. Even when $I_{BP}$ equals zero, $I_S=-I_C$ and as $I_S$ flows through resistor 32, a zero-current condition cannot be achieved; thus, some current measurement inaccuracy is inevitable with this approach.

In FIG. 2b, the arrangement of battery 30 and current sense resistor 32 is changed. Here, the current $I_C$ required by circuit 38 does not pass through sense resistor 32, enabling the voltage across sense resistor 32 when $I_S$ is zero to be measured. Now, however, the $I_C$ current drain is never accounted for, thereby introducing a different standard error in the system.

Yet another arrangement is shown in FIG. 2c, in which current sense resistor 32 is referenced to ground. However, with resistor 32 connected between ground and battery 30, $I_S$ cannot be made zero, and thus the system cannot be calibrated for zero offset.

In the arrangement shown in FIG. 2d, a separate "battery ground" 40 separate from system common (14) is employed, which allows the system to measure zero current. Here, however, $I_C$ is not measured and continually drains the battery. Furthermore, the lack of a common ground between battery and system induces a ground shift which is proportional to $I_S$. For a large current load, this ground shift significantly reduces the noise margin of digital signals between system host 20 and circuitry 38.

SUMMARY OF THE INVENTION

A rechargeable battery measurement and calibration system is presented which overcomes the problems found in the prior art approach described above. The current measurement and battery status intelligence is moved outside of the battery pack, resulting in a system which has both higher accuracy and lower cost than prior art systems.

In accordance with the present invention, the battery pack is greatly simplified: the current sensing element is moved outside of the battery pack, the FET switches can be eliminated, and the battery status intelligence is moved from the battery pack to the system host; these steps significantly reduce the cost, complexity, and power consumption of the battery pack. The system host controls the measurement and calibration of the battery system; the host can command a zero current flow through the current sensing element, enabling the acquisition of accurate calibration data. In a preferred embodiment, calibration values are determined under both zero-current and non-zero current conditions, enabling linearity errors that might otherwise be present in the current measurements to be reduced.

The present system complies with the SBS-IF specification for Smart Battery systems, and is well-suited for use with mobile computers.

Further features and advantages of the invention will be apparent to those skilled in the art from the following detailed description, taken together with the accompanying drawings.

DETAILED DESCRIPTION OF THE INVENTION

Figure 1:
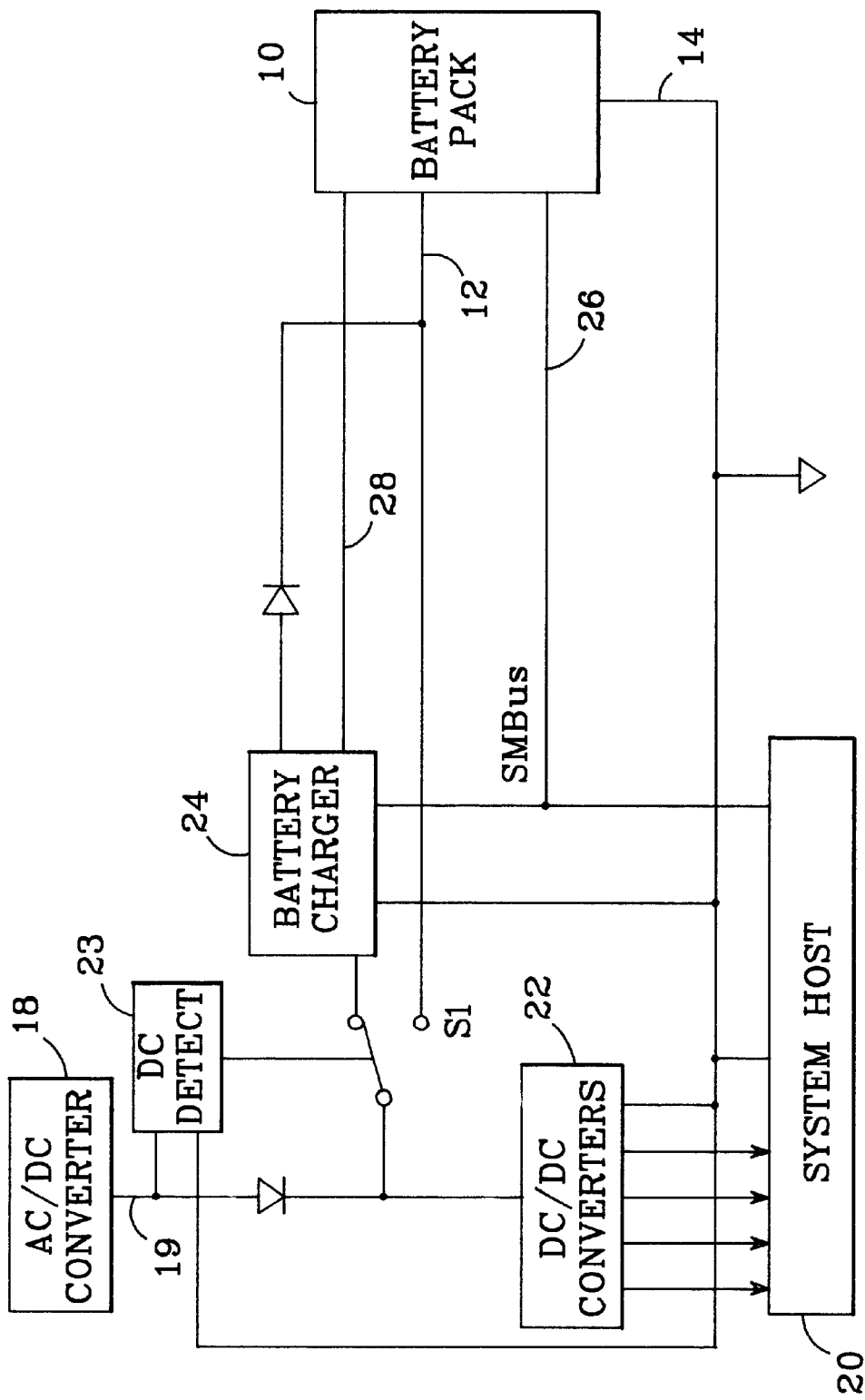
FIG. 1 is a block diagram of a known battery system.
Figure 2A:
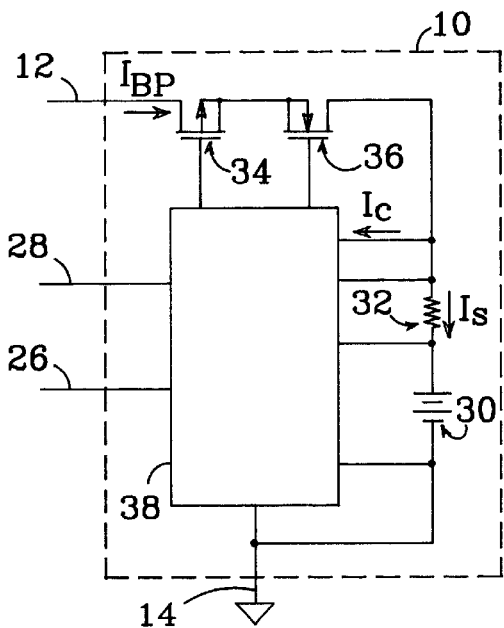
FIGS. 2a–2d are block/schematic diagrams of four known battery pack implementations.
Figure 2B:
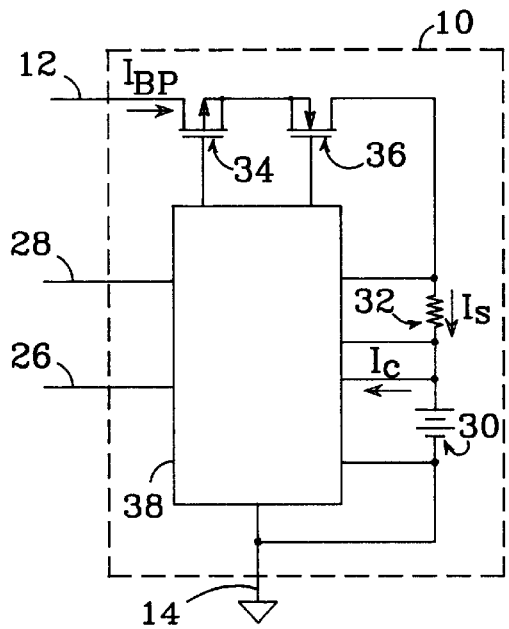
Figure 2C:
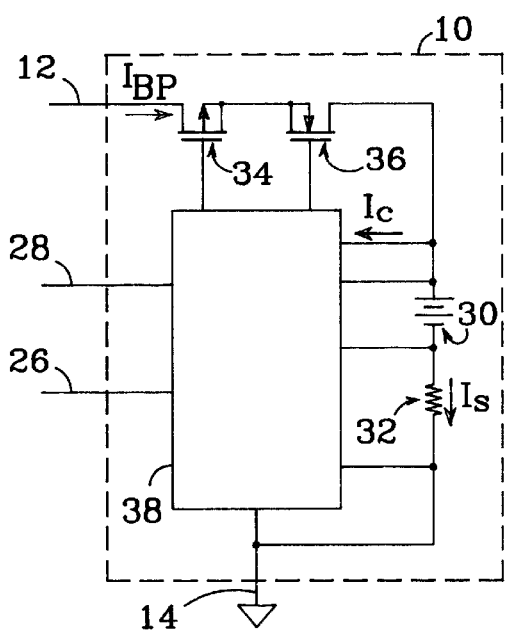
Figure 2D:
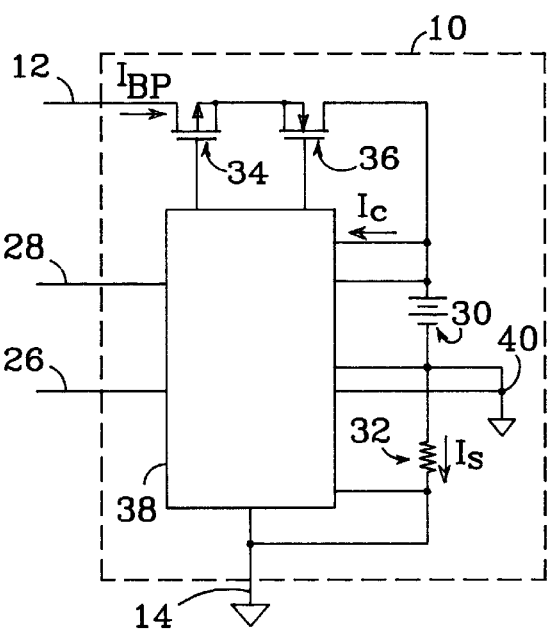
Figure 3:
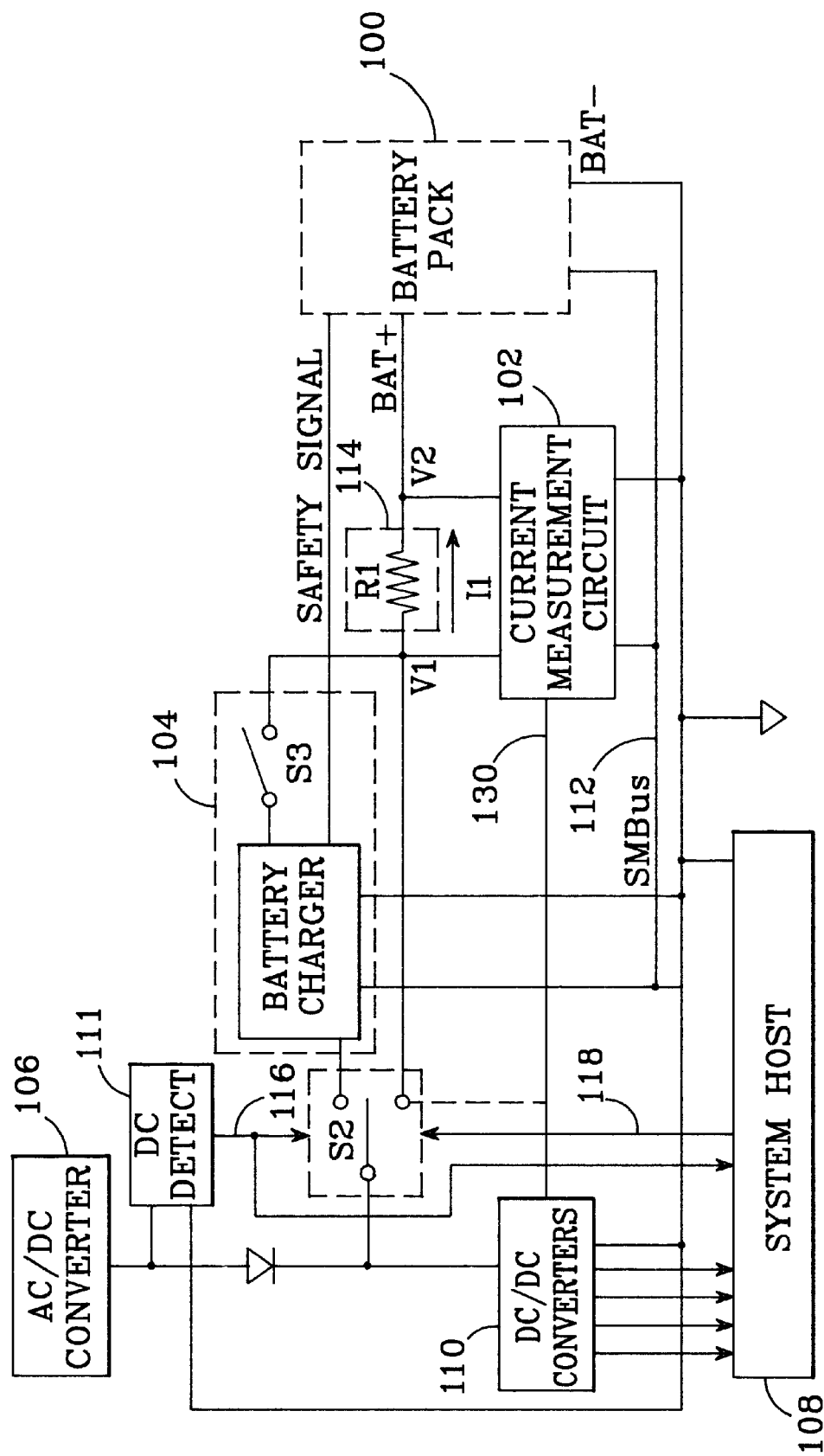
FIG. 3 is a block diagram of a rechargeable battery measurement and calibration system in accordance with the present invention.

A novel rechargeable battery measurement system which complies with the SBS-IF smart battery system standard, yet has a lower cost and provides higher accuracy than previous systems, is shown in FIG. 3. The system is used to determine the status of a battery contained within a battery pack 100 having positive and negative terminals BAT+ and BAT−, respectively. As used herein, a "battery pack" refers to a portable, self-contained assembly which includes a rechargeable battery and associated circuitry. The system includes a current measurement circuit 102 external to battery pack 100, which is used for measuring the current provided to and drawn from battery pack 100. When powered and so commanded, a battery charging circuit 104 provides charging current to battery pack 100 via its BAT+ terminal. An AC/DC converter 106 provides a DC supply voltage to the system when connected to an AC power source. When present, the DC supply voltage powers a system host 108, typically via one or more DC/DC converters 110 which provide respective power forms to host 108. The presence or absence of the DC supply voltage is detected by a power detection circuit 111, the output of which controls a switch S2 connected between the input of DC/DC converters 110, battery charging circuit 104, and the BAT+ terminal of battery pack 100. When the DC supply voltage is present, S2 is operated to connect the supply voltage to battery charging circuit 104; when absent, S2 connects BAT+ to the input of DC/DC converters 110. Communications between battery pack 100, current measurement circuit 102, battery charging circuit 104 and system host 108 are handled by a serial bus 112 which conforms to the SMBus standard.

Note that the embodiment described above is merely exemplary. The described embodiment is characteristic of a system that can be powered either solely by battery pack 100, or solely by power from AC/DC converter 106. The invention is equally applicable to a system that uses a small AC/DC converter that is insufficient to power system host 108 by itself. In this case, circuitry in and around switch S2 is changed to allow power flow from both AC/DC converter 106 and battery pack 100. Battery charger 104 could be used whenever the power required by battery charger 104, DC/DC converters 110, and system host 108 is less than the total power available from AC/DC converter 106.

Figure 4:
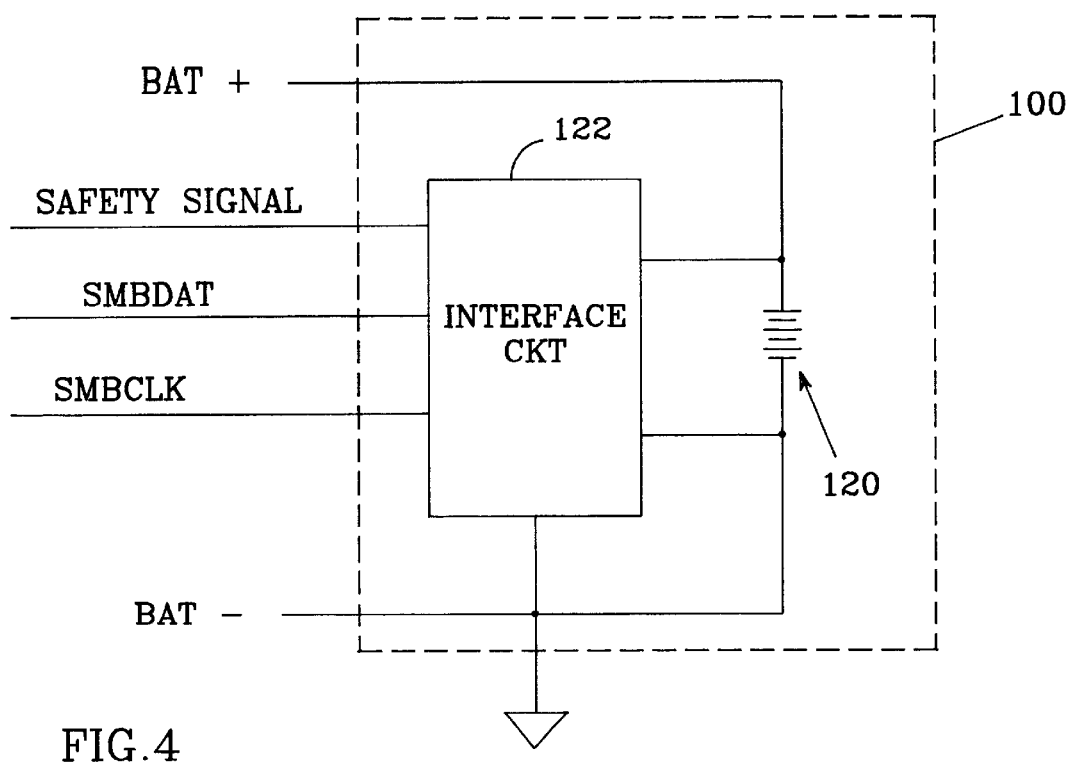
FIG. 4 is a block/schematic diagrams of a battery pack implementation in accordance with the present invention.

The system is arranged with the battery status intelligence, which previously resided within the battery pack, now moved into the system host. Similarly, the current sensing and measurement duties formerly performed within the battery pack are now handled by circuitry external to the battery pack. Moving these tasks in this way greatly simplifies the battery pack. A simplified battery pack 100 suitable for use with the present system is shown in FIG. 4. Pack 100 includes a rechargeable battery 120, and circuitry 122 which need provide only basic interface tasks, such as providing a safety signal line and lines necessary for communication via the SMBus such as SMBDAT and SMBCLK. Simplifying the battery pack in this way reduces its cost, complexity, and power consumption and when compared with previous packs.

As noted above, the battery status intelligence resides in system host 108. For example, the calculation of the charge Q added to or lost from battery pack 100 is made by the system host. This approach allows the system host to control the battery system so that overcharging and over-discharging of the battery is prevented. This enables the FET switches and associated local control circuitry found in prior art battery packs to be eliminated. Note, however, that if FET switches are desired within the pack, for product liability protection, for example, the system can still force zero current to the pack with a command that would open the protection FETs. Therefore, redundant FETs are not needed.

Using this new circuit configuration, the battery capacity estimation is still based on the integration of current over time. Now, however, the calculation is greatly simplified, and low-cost but highly linear integrated circuits can be used to make current measurements. Referring back to FIG. 3, the present system includes a current sensing element 114, preferably a resistor having a resistance R1, connected in series with the BAT+ terminal of battery pack 100 such that the current I1 which flows into and out of the pack flows through element 114. As noted above, current sensing element 114 is external to battery pack 100. The current I1 flowing through element 114 causes voltages V1 and V2 to develop at its two terminals, such that the current I1 into and out of the battery is given by:

$$I1=(V1-V2)/R1.$$

Current measurement circuit 102 is arranged to produce an output V' which varies with the differential voltage V1−V2 and an offset error voltage $V_{error,zero}$, such that $V'=(V1-V2)+V_{errr,zero}$. Thus, when I1 equals 0, V1 equals V2, and V' reduces to $V'=V_{error,zero}$.

The present invention enables the value of $V_{error,zero}$ to be easily determined by direct measurement. This is not possible in prior art systems which located current sense and measurement circuitry within the battery pack, because the battery pack itself cannot arrange a zero-current flow situation in its current sense resistor. The system can ensure that I1 is zero by isolating current sensing element 114. This can be accomplished in several ways. The system is preferably arranged such that, in addition to being controllable by power detector 111 (via control line 116), switch S2 is also controllable by system host 108, via a control line 118. Also, switch S2 preferably has an "open" position, in which it is connected to neither charging circuit 104 nor battery pack 100. When so arranged, current sensing element 114 is isolated from both AC/DC converter 106 and DC/DC converters 110 by connecting AC/DC converter 106 to an AC power source, and:

1) commanding S2 into its open position via control line 118. The system host is operational due to the presence of the DC supply voltage, or
2) commanding S2 to supply charging circuit 104 with power and either a) commanding the charging circuit to produce no charging current, or b)opening an optional system-host-controllable switch S3 which is connected in series with the output of the battery charger.

When current sensing element 114 is so isolated, I1 is known with certainty to be zero. A measurement of V' is made, with the measured V' value defining $V_{error,zero}$.

With $V_{error,zero}$ known, current measurements are easily and accurately determined by subtracting $V_{error,zero}$ from the output V' of current measurement circuit 102, and dividing by R1. That is:

$$I1=(V'-V_{error,zero})/R1$$

By integrating I1 over time (t0 to t1), the charge Q added to or lost from the battery over a period of time is determined, as follows:

$$Q = \int_{t0}^{t1} I1 dt$$

$$Q = \int_{t0}^{t1} (V' - V_{error,zero})/R1 dt$$

A means of integrating I1 over time is provided (as described below) to determine Q.

By moving the current sensing and battery status intelligence out of the battery pack, the present system removes battery-side measurement errors that might be present using typical and uncalibrated battery fuel gauging. The system enables a mobile computer to actively calibrate its battery measurement system, thereby permitting the calculation of highly accurate run-time estimates.

Current measurement circuit 102 contains circuitry that requires power to function, which is received at an input 130. Unlike some conventional battery systems, the power required by current measurement circuit 102 is not an error factor when making I1 measurements, so long as the power for circuit 102 is derived from the system host side of current sensing element 114. When so arranged, when I1>0 (charging), current measurement circuit 102 receives power from the DC/DC converters 110, and all current I1 flowing into the battery is measured without loss. When I1<0 (discharging), the supply current of current measurement circuit 102 is included in I1, as long as power input 130 is connected to the system host side of R1; i.e., to DC/DC converters 110 or, alternatively, to a point near switch S2.

Figure 5B:
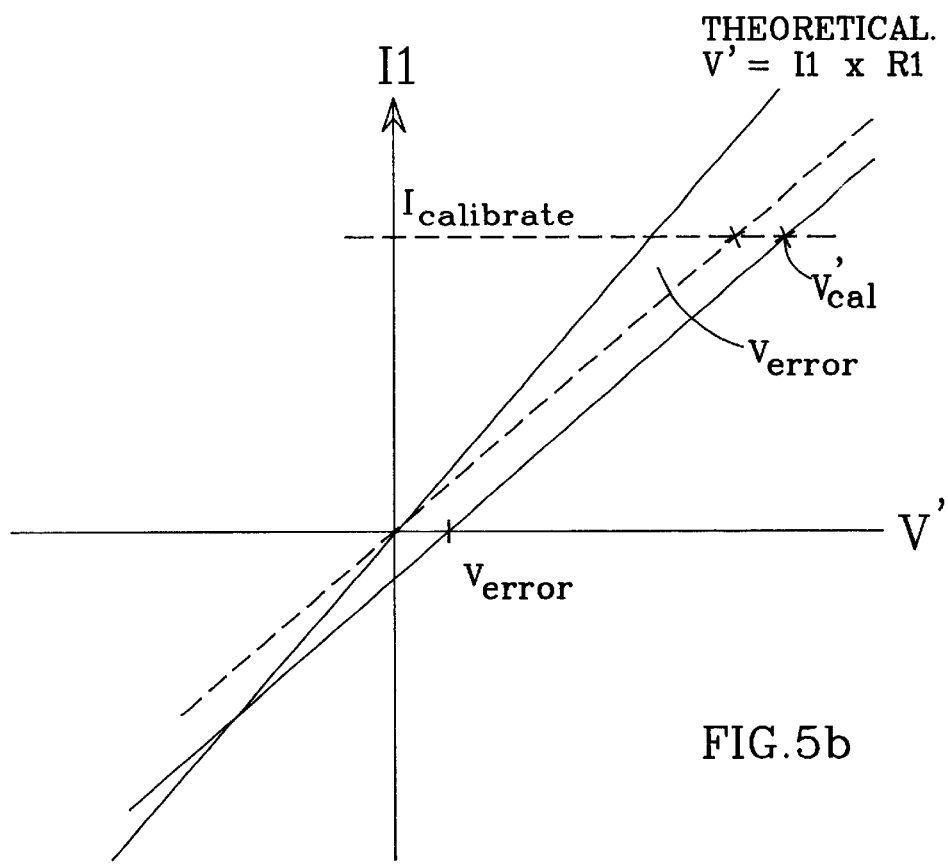
FIG. 5b is a graph illustrating an analysis which could be employed to calibrate measured current values.
Figure 5A:
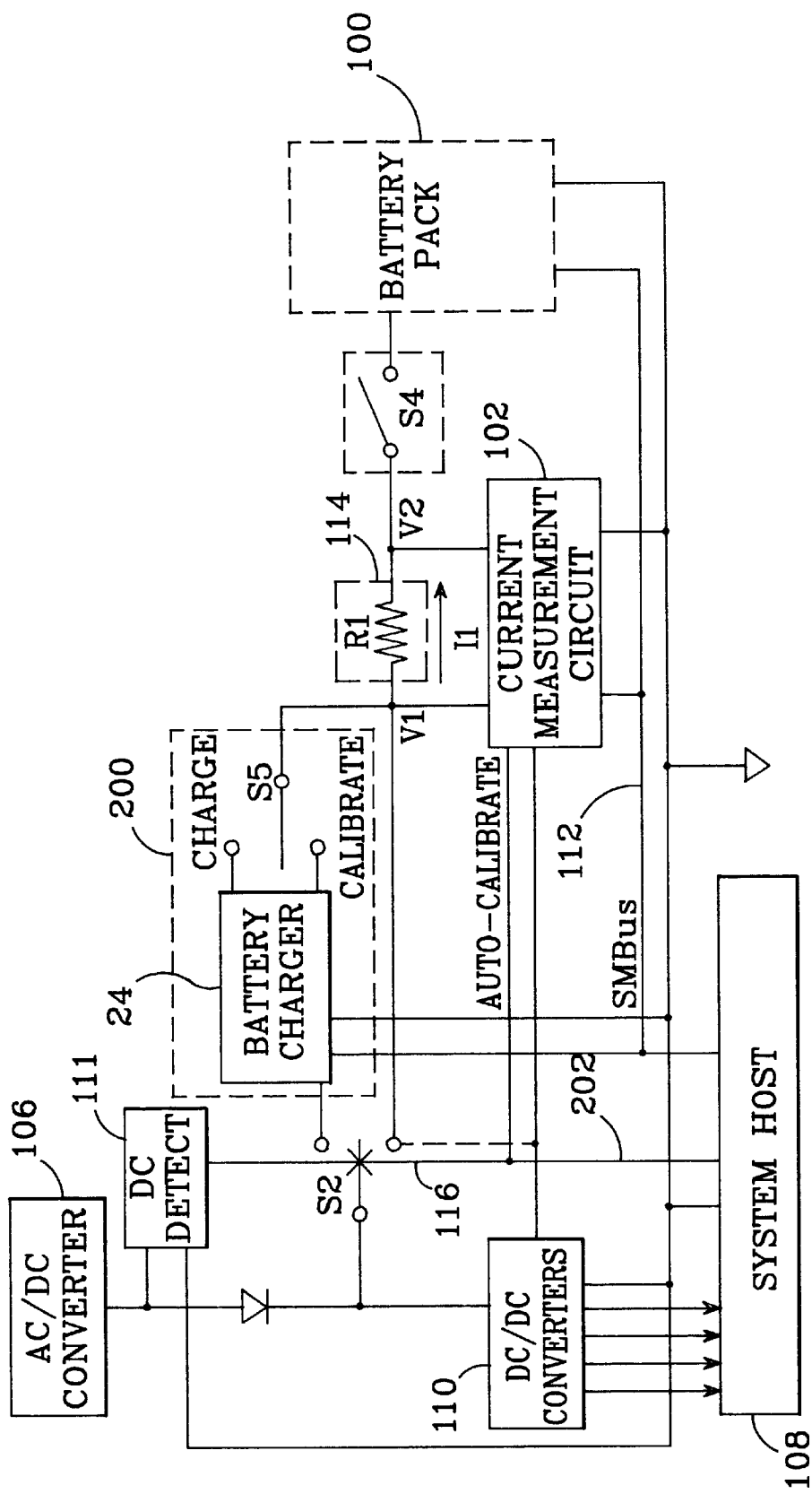
FIG. 5a is a block diagram of a preferred embodiment of a rechargeable battery measurement and calibration system in accordance with the present invention.

A preferred embodiment of a rechargeable battery measurement and calibration system per the present invention is shown in FIG. 5a. Elements common to both the FIG. 3 and FIG. 5a embodiments are identified with common reference numbers. Here, a battery charging circuit 200 includes a switch S5 which has "charge", "calibrate", and OFF positions; the switch is controlled by system host 108 via the SMBus. The "calibrate" position is included to enable the current measurement system to be calibrated for a non-zero I1 value. Battery charging circuit 200 includes calibration circuitry which draws a fixed current $I_{calibrate}$ from battery pack 100 when S5 is in the calibrate position, and when the battery is sufficiently discharged to accept charging in a "constant current mode". A determination of V' is made while $I_{calibrate}$ is being drawn, which is divided by R1 to produce an I1 value. With $I_{calibrate}$ known, a "discharge" error voltage $V_{error}$ can be determined, as follows:

1) Force $I_{calibrate}$ and measure an "$I1_{cal}$" value given by:

$$I1_{cal}=(V1-V2)/R1$$

In response, current measurement circuit 102 outputs a value "$V'_{cal}$" given by:

$$V'_{cal}=V1-V2+V_{error,zero}$$

2) An error in reading charging current arises because $I1_{cal}$ is slightly different than the known $I_{calibrate}$ current. The difference ΔI between these values is given by:

$$\Delta I=I_{calibrate}-I1_{cal}.$$

This error appears across R1 as a voltage $V_{error}$ given by:

$$V_{error}=\Delta I*R1$$

$$V_{error}=(I_{calibrate}-I1_{cal})*R1$$

$$V_{error}=I_{calibrate}*R1-[(V1-V2)/R1]*R1$$

3) Substituting:

$$V_{error}=I_{calibrate}*R1-(V'_{cal}-V_{error,zero})$$

$$V_{error}=I_{calibrate}*R1-V'_{cal}+V_{error,zero}$$

With both $V_{error,zero}$ and $V_{error}$ known, a linear calibration function can be defined. This function is used to correct V' errors for all I1 measurements, thereby reducing the system's non-linearity errors. Note that $I_{calibrate}$ need not be equal to the full-scale I1 value. For example, some batteries discharge at 10 amps or more; calibrating for this full-scale current load would be impractical. It is only necessary that calibrate be a non-zero current sufficient to define an accurate calibration function; a value of one amp or less is typically sufficient for a mobile computer system.

The calibration values can be stored in system host 108, which then uses them to calibrate measured I1 values. One possible calibration method employs an analysis as shown in the graph in FIG. 5b. Alternatively, the calibration values can be stored and the corrections made within current measurement circuit 102 itself. In this case, an "auto-calibrate" signal 202 is routed to switch S2 and to circuit 102. When the auto-calibrate signal is activated, S2 is moved to its "open" position (such that I1=0) and current measurement circuit 102 is commanded to make a V' measurement. This measurement is equated to $V_{error,zero}$ and stored within circuit 102. In a like manner, the $V_{error}$ value is determined and stored. The stored values are used to automatically correct measured I1 values (as discussed below) before they are passed on to system host 108.

Figure 6:
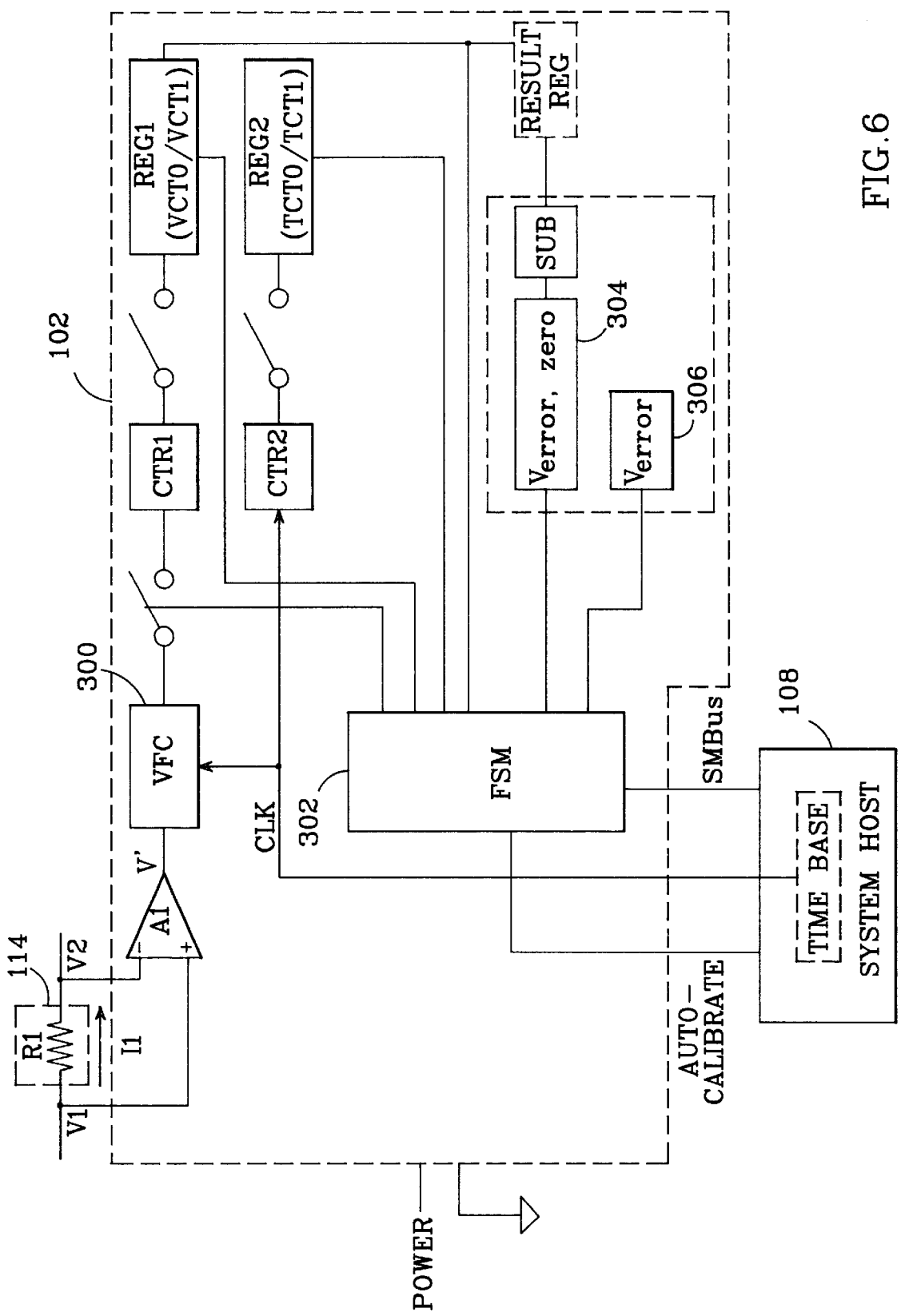
FIG. 6 is one possible embodiment of a current measurement circuit in accordance with the present invention.

One possible embodiment of current measurement circuit 102 is shown in FIG. 6. The voltage across current sensing element 114 is connected to and differentially measured by an operational amplifier A1. The output of A1 is V', which is fed to a voltage-to-frequency converter (VFC) which also receives a free-running clock signal CLK, from the real-time clock of system host 108, for example. VFC outputs a pulse train, the frequency of which varies with V'. The pulse train is fed to a first counter CTR1 which counts the pulses. A second counter CTR2 is driven by CLK and thus runs synchronously with VFC 300, and counts CLK signal pulses. Knowing the count of VFC pulses with respect to the count of CLK pulses enables I1 to be determined. The outputs of CTR1 and CTR2 are stored in registers REG1 and REG2, respectively. A finite state machine 302 is arranged to read the REG1 and REG2 values and to convey them to system host 108 via the SMBus. FSM 302 contains the sequential logic necessary to control the current measurement circuit as described herein.

As noted above, it is possible to implement current measurement circuit 102 with an "auto-calibrate" function, such that corrections to the I1 measurements based on the $V_{error,zero}$ and $V_{error}$ values are made within the circuit. In this case, the $V_{error,zero}$ and $V_{error}$ values are stored in a pair of registers 304 and 306 which are within circuit 102 and accessible to FSM 302. A subtraction circuit (SUB) and a results register (RESULT REG) may also be included, which are arranged to compute REG1-$V_{error,zero}$ and store the outcome in RESULT REG, which is then read by FSM 302.

When current measurement circuit 102 is configured as shown in FIG. 6, the process of obtaining and storing auto-calibration results proceeds as follows:
1. System host 108 configures the system such that no current is flowing in current sensing element 114 (by controlling switches S2 or S2 and S3 appropriately).
2. System host 108 signals circuit 102 to begin a current measurement, either via the auto-calibration signal (if present) or the SMBus.
3. The value of CTR1 is transferred to REG1 and stored as VCT0 (VFC count at time t0).
4. The value of CTR2 is transferred to REG2 and stored as TCT0 (relative time at time t0).
5. A time interval determined by system host 108 passes.
6. The value of CTR1 is transferred to REG1 and stored as VCT1 (VFC count at time t1).
7. The value of CTR2 is transferred to REG2 and stored as TCT1 (relative time at time t1).

The difference in counts VCT0 and VCT1, divided by a known time, corresponds to offset voltage $V_{error,zero}$, as follows:

$$V_{error,zero}=V'=(VCT1-VCT0)/(TCT1-TCT0)|\text{when } I1=0$$

$V_{error,zero}$ is stored by either system host 108 or within current measurement circuit 102 as described above. In a like manner, $V_{error}$ may be calculated and stored, using the same equation to determine $V'_{cal}$ at a finite current and storing the data in registers to perform the equation:

$$V_{error}=I_{calibrate}*R1-V'_{cal}+V_{error,zero}.$$

Note that the implementation of current measurement circuit 102 shown in FIG. 6 is merely exemplary; many different circuits might be employed to measure the voltage across current sensing element 114 and convey the result to the system host.

System host 108 is programmed to control the battery system as discussed above, and to process the measured current values as necessary to provide the battery status information to a user. For example, system host 108 performs the integration of current over time needed to determine charge Q, and provides the user interface needed to present the acquired battery status data.

While particular embodiments of the invention have been shown and described, numerous variations and alternate embodiments will occur to those skilled in the art. Accordingly, it is intended that the invention be limited only in terms of the appended claims.

We claim:
1. A rechargeable battery measurement system, comprising:
   a power source which provides a DC supply voltage,
   a battery charging circuit which is switchably powered by said DC supply voltage and which, when powered, provides a charging current suitable for charging a rechargeable battery which is part of a battery pack,
   a current sensing element external to said battery pack and connected to carry current provided to and drawn from said battery pack,
   a current measurement circuit connected to said current sensing element and arranged to produce an output which varies with said sensed current, said current measurement circuit connected such that it is powered by current which does not pass through said current sensing element when said charging circuit is providing charging current to said battery pack, and
   a system host, said measurement system arranged such that said system host is powered by said DC supply voltage when present and by said battery pack otherwise, said system host connected to receive said current measurement circuit output and programmed to calculate battery status information for presentation to a user based on said current measurements.

2. The measurement system of claim 1, wherein said power source is an AC/DC converter.

3. The measurement system of claim 1, further comprising a battery pack which produces a battery voltage between positive and negative terminals which are connected to said measurement system, said battery pack comprising:
   a rechargeable battery, and
   interface circuitry for interfacing said battery to said measurement system.

4. The measurement system of claim 3, wherein said measurement system and said battery pack comprise a mobile computer battery system.

5. The measurement system of claim 4, wherein said measurement system and said battery pack comply with the specifications of the Smart Battery System Implementers Forum (SBS-IF).

6. The measurement system of claim 5, further comprising an SMBus physical layer which interconnects said system host with said battery charging circuit, said battery pack, and said current measurement circuit.

7. The measurement system of claim 1, wherein said current sensing element is a resistor.

8. The measurement system of claim 1, further comprising a switch connected between said power source, said battery charging circuit, and said current sensing element, said measurement system arranged to control said switch such that, when said DC supply voltage is present, said battery charging circuit and said system host are powered by said DC supply voltage, and when said DC supply voltage is absent, said system host is powered by said battery pack.

9. The measurement system of claim 1, wherein said current sensing element has voltages V1 and V2 at first and second terminals, respectively, and has a resistance R1, said current measurement circuit arranged to produce a voltage V' which varies with the differential voltage V1−V2 across said current sensing element such that the current I1 through said current sensing element is given by (V1−V2)/R1, said output of said current measurement circuit being proportional to I1.

10. The measurement system of claim 9, said measurement system arranged to determine a voltage offset error $V_{error,zero}$ by arranging said system such that no current flows in said current sensing element, noting the value of V', and equating $V_{error,zero}$ with V', said measurement system further arranged to correct the output of said current measurement circuit based on the value of $V_{error,zero}$.

11. The measurement system of claim 10, wherein said current measurement circuit further comprises:
   a voltage-to-frequency converter (VFC) which receives V' as an input and produces a pulse train output having a frequency which varies with V',
   a first counter connected to count the pulses in said pulse train output,
   said measurement system arranged to determine the number of said pulses counted in a predetermined time period, said count being proportional to the value of I1.

12. The measurement system of claim 11, further comprising a second counter connected to count the pulses of a free-running clock signal which operates at a known frequency to provide said predetermined time period, said VFC driven synchronously with said second counter by said free-running clock signal.

13. The measurement system of claim 10, wherein said measurement system is further arranged to command a known calibration current $I_{calibrate}$ through said current sensing element, note the value of V', calculate I1 based on V' and $V_{error,zero}$, and determine a discharge error voltage $V_{error}$ which is given by:

$$V_{error}=I_{calibrate}*R1-V'_{cal}+V_{error,zero};$$

where $$V'_{cal}=V1-V2+V_{error,zero};$$

the values of $V_{error}$ and $V_{error,zero}$ stored and used to reduce linearity errors present in said V' measurements.

14. The measurement system of claim 13, wherein said battery charging circuit includes a calibration circuit arranged to draw said calibration current $I_{calibrate}$ through said current sensing element in response to a calibrate command.

15. The measurement system of claim 14, wherein said battery charging circuit includes a switch which, in response to a command from said system host, connects said current sensing element to said calibration circuit.

16. The measurement system of claim 13, wherein said current measurement circuit output is proportional to I1 and said system host is programmed to store and use said $V_{error}$ and $V_{error,zero}$ values to reduce linearity errors present in I1.

17. The measurement system of claim 13, wherein said current measurement circuit output is proportional to I1 and said $V_{error}$ and $V_{error,zero}$ values are stored within said current measurement circuit, said current measurement circuit arranged to use said $V_{error}$ and $V_{error,zero}$ values to reduce linearity errors present in I1.

18. The measurement and calibration system of claim 17, further comprising a battery pack to which said measurement and calibration system is connected, said battery pack comprising:

a rechargeable battery, and interface circuitry for interfacing said battery to said measurement and calibration system.

19. A rechargeable battery measurement and calibration system which complies with the specifications of the Smart Battery System Implementers Forum (SBS-IF), comprising:

an AC/DC converter which provides a DC supply voltage, a battery charging circuit which is powered by said DC supply voltage and is arranged to provide a charging current suitable for charging a rechargeable battery which is part of a battery pack in response to a command signal, a current sense resistor external to said battery pack, said current sense resistor having a resistance R1 and connected to carry current I1 provided to and drawn from said battery pack, said current I1 developing a voltage across said resistor given by the difference between the voltage V1 at one of its terminal and the voltage V2 at its other terminal, a current measurement circuit connected across said current sense resistor and arranged to produce an output which varies with current I1, said current measurement circuit connected such that it is powered by current which does not pass through said current sense resistor when said charging circuit is providing charging current to said battery pack, a system host, said measurement and calibration system arranged such that said system host is powered by said DC supply voltage when present and by said battery pack otherwise, said system host connected to receive said current measurement circuit output and programmed to calculate battery status information for presentation to a user based on said current measurements, and an SMBus physical layer which interconnects said system host with said battery charging circuit, said battery pack, and said current measurement circuit.

20. The measurement and calibration system of claim 19, wherein said current measurement circuit is arranged to produce a voltage V' which varies with the differential voltage V1−V2 across said current sense resistor, said measurement and calibration system arranged to determine a voltage offset error $V_{error,zero}$ by arranging said system such that no current flows in said current sense resistor, noting the value of V', and equating $V_{error,zero}$ with V', said measurement and calibration system further arranged to correct the output of said current measurement circuit based on the value of $V_{error,zero}$.

21. The measurement and calibration system of claim 20, wherein said current measurement circuit further comprises:

a voltage-to-frequency converter (VFC) which receives V' as an input and produces a pulse train output having a frequency which varies with V', and a first counter connected to count the pulses in said pulse train output, said measurement and calibration system arranged to determine the number of said pulses counted in a predetermined time period, said count being proportional to the value of I1.

22. The measurement and calibration system of claim 21, further comprising a second counter connected to count the pulses of a free-running clock signal which operates at a known frequency to provide said predetermined time period, said VFC driven synchronously with said second counter by said free-running clock signal.

23. The measurement and calibration system of claim 20, wherein said measurement and calibration system is arranged to command a known calibration current $I_{calibrate}$ through said current sense resistor, note the value of V' with $I_{calibrate}$ in said current sense resistor, calculate I1 based on V' and $V_{error,zero}$, and determine a discharge error voltage $V_{error}$ which is given by:

$$V_{error}=I_{calibrate}*R1-V'_{cal}+V_{error,zero};$$

where $$V'_{cal}=V1-V2+V_{error,zero};$$

the values of $V_{error}$ and $V_{error,zero}$ stored and used by said measurement and calibration system to correct linearity errors present in said V' measurements.

24. The measurement and calibration system of claim 23, wherein said system host is programmed to use said $V_{error}$ and $V_{error,zero}$ values to correct linearity errors present in I1.

25. The measurement and calibration system of claim 23, wherein said $V_{error}$ and $V_{error,zero}$ values are stored within said current measurement circuit and said current measurement circuit is arranged to use said $V_{error}$ and $V_{error,zero}$ values to correct linearity errors present in I1.

26. The measurement and calibration system of claim 23, wherein said battery charging circuit includes a calibration circuit arranged to draw said calibration current $I_{calibrate}$ through said current sense resistor, said battery charging circuit further comprising a switch which, in response to a calibrate command from said system host, connects said current sense resistor to said calibration circuit.

* * * * *